(12) United States Patent
Baldwin

(10) Patent No.: US 11,777,293 B1
(45) Date of Patent: Oct. 3, 2023

(54) CEILING FAN BRACE BRACKET

(71) Applicant: Jeffrey P. Baldwin, Anthem, AZ (US)

(72) Inventor: Jeffrey P. Baldwin, Anthem, AZ (US)

(73) Assignee: Titan3 Technology LLC, Phoenix, AZ (US)

( * ) Notice: Subject to any disclaimer, the term of this patent is extended or adjusted under 35 U.S.C. 154(b) by 242 days.

(21) Appl. No.: 17/234,683

(22) Filed: Apr. 19, 2021

Related U.S. Application Data

(60) Provisional application No. 63/011,310, filed on Apr. 17, 2020.

(51) Int. Cl.
| | |
|---|---|
| H02G 3/00 | (2006.01) |
| H02G 3/12 | (2006.01) |
| H02G 3/08 | (2006.01) |
| E04B 9/00 | (2006.01) |
| H02G 3/20 | (2006.01) |
| F16M 13/02 | (2006.01) |

(52) U.S. Cl.
CPC ............ *H02G 3/125* (2013.01); *E04B 9/006* (2013.01); *H02G 3/08* (2013.01); *F16M 13/027* (2013.01); *H02G 3/20* (2013.01); *Y10S 248/906* (2013.01)

(58) Field of Classification Search
None
See application file for complete search history.

(56) References Cited

U.S. PATENT DOCUMENTS

| | | | | |
|---|---|---|---|---|
| 3,729,159 A | * | 4/1973 | Foster | E04G 17/02 249/219.2 |
| 5,044,582 A | * | 9/1991 | Walters | H02G 3/126 248/200.1 |
| 5,303,894 A | * | 4/1994 | Deschamps | H02G 3/125 411/433 |
| 5,624,202 A | * | 4/1997 | Grierson | F21V 21/005 403/380 |
| 5,954,304 A | * | 9/1999 | Jorgensen | H02G 3/125 248/200.1 |
| 11,536,029 B2 | * | 12/2022 | Beristany | E04C 3/14 |
| 2003/0006353 A1 | * | 1/2003 | Dinh | F04D 29/601 248/343 |
| 2008/0067313 A1 | * | 3/2008 | Herth | H02G 3/20 248/343 |
| 2008/0179481 A1 | * | 7/2008 | Rubin de la Borbolla | H02G 3/125 248/200.1 |
| 2022/0243741 A1 | * | 8/2022 | Wang | F16M 13/027 |

* cited by examiner

*Primary Examiner* — Steven M Marsh
(74) *Attorney, Agent, or Firm* — BOOTH UDALL FULLER, PLC; Kenneth C. Booth

(57) ABSTRACT

A ceiling fan brace bracket assembly with a bracket, at least two holes, at least one first screw, and at least one second screw. The bracket has a channel that opens toward a bottom of the bracket and at least one lip that extends along the channel. The channel is sized and shaped to extend around a ceiling fan brace. The at least two holes extend through the at least one lip, and each of the at least two holes is configured to align with a corresponding screw hole in an electrical box. The at least one first screw is a press-fit screw and is configured to extend downward through a first hole of the at least two holes. The at least one second screw is configured to extend upward through a second hole of the at least two holes.

17 Claims, 13 Drawing Sheets

CEILING FAN BRACE BRACKET

CROSS REFERENCE TO RELATED APPLICATIONS

This application claims the benefit of the filing date of U.S. Provisional Patent Application 63/011,310 entitled "Ceiling Fan Brace Bracket" to Baldwin that was filed on Apr. 17, 2020, the disclosure of which is hereby incorporated herein by this reference.

TECHNICAL FIELD

Aspects of this document relate generally to brackets, and more specifically to brackets for attaching electrical boxes to ceiling fan braces.

BACKGROUND

Electrical boxes are commonly used in ceilings to provide electrical current to and support the weight of light fixtures and ceiling fans. These electrical boxes must be secured to the structure of the house, such as a joist or stud, to support the weight of these fixtures. When the desired location for the fixtures does not have a joist or stud sufficiently close, a brace is often used as a support. The brace attaches to two joists and spans the gap between them. The electrical box can then be attached to and supported by the brace in the desired location.

Brackets are used to attach the electrical box to the brace. However, it can be difficult to install the bracket and attach the electrical box because of the difficulty in aligning the box and getting screws started in threaded holes in the bracket. If this is attempted from below, the hole can't be seen by the user, but if the user works from above, in the attic, it is often dark and therefore hard to see the holes. In addition, having a large number of screws protruding into the electrical box decreases the available space for wiring and presents a large number of abrasive surfaces, such as the threading on the screws, to the wires.

SUMMARY

Aspects of this document relate to a ceiling fan brace bracket assembly comprising a bracket having a channel opening toward a bottom of the bracket and at least one lip extending along the channel, the channel sized and shaped to extend around a ceiling fan brace, at least two holes extending through the at least one lip, each of the at least two holes configured to align with a corresponding screw hole in an electrical box, at least one first screw configured to extend downward through a first hole of the at least two holes and the corresponding screw hole in the electrical box and align the first hole with the corresponding screw hole, wherein the first hole is unthreaded, the at least one first screw is a press-fit screw, and, when the at least one first screw extends through the first hole, a head of the at least one first screw is on a top of the bracket and a shaft of the at least one first screw extends down away from the bottom of the bracket, at least one nut sized to threadedly couple with the at least one first screw and configured to hold the electrical box against the bottom of the bracket, and at least one second screw configured to extend upward through a second hole of the at least two holes and the corresponding screw hole, wherein the electrical box is configured to couple to the bracket through the at least one second screw, and wherein when the at least one second screw extends through the second hole, a head of the at least one second screw is adjacent the bottom of the bracket and a shaft of the at least one second screw extends up away from the top of the bracket.

Particular embodiments may comprise one or more of the following features. The bracket assembly may further comprise a raised ridge extending across the top of the bracket perpendicular to the channel, the raised ridge configured to increase the rigidity of the bracket. The at least one first screw may have a plurality of teeth extending radially away from the at least one first screw, the plurality of teeth may form a tooth outer diameter greater than a hole outer diameter of the first hole, and when the at least one first screw is pressed into the first hole, the plurality of teeth may engage with the first hole to hold the at least one first screw in place. The channel may have two sides, wherein the two sides of the channel are angled inward and configured to grip the ceiling fan brace when installed on the ceiling fan brace.

Aspects of this document relate to a ceiling fan brace bracket assembly comprising a bracket having a channel opening toward a bottom of the bracket and at least one lip extending along the channel, the channel sized and shaped to extend around a ceiling fan brace, at least two holes extending through the at least one lip, each of the at least two holes configured to align with a corresponding screw hole in an electrical box, at least one first screw configured to extend downward through a first hole of the at least two holes and align the first hole with the corresponding screw hole, wherein when the at least one first screw extends through the first hole, a shaft of the at least one first screw extends down away from the bottom of the bracket, and at least one second screw configured to extend upward through a second hole of the at least two holes, wherein the electrical box is configured to couple to the bracket through the at least one second screw, and wherein when the at least one second screw extends through the second hole, a shaft of the at least one second screw extends up away from the top of the bracket.

Particular embodiments may comprise one or more of the following features. The bracket assembly may further comprise a raised ridge extending across the top of the bracket perpendicular to the channel, the raised ridge configured to increase the rigidity of the bracket. The at least one first screw may have a plurality of teeth extending radially away from the at least one first screw, the plurality of teeth may form a tooth outer diameter greater than a hole outer diameter of the first hole, and when the at least one first screw is pressed into the first hole, the plurality of teeth may engage with the first hole to hold the at least one first screw in place. The channel may have two sides, wherein the two sides of the channel are angled inward and configured to grip the ceiling fan brace when installed on the ceiling fan brace. The first hole may be unthreaded. The at least one first screw may be a press-fit screw. The bracket assembly may further comprise at least one nut sized to threadedly couple with the at least one first screw and configured to hold the electrical box against the bottom of the bracket.

Aspects of this document relate to a ceiling fan brace bracket assembly comprising a bracket having a channel opening toward a bottom of the bracket and at least one lip extending along the channel, the channel sized and shaped to extend around a ceiling fan brace, at least one hole extending through the at least one lip, the at least one hole configured to align with a corresponding screw hole in an electrical box, at least one screw configured to extend through the at least one hole and align the at least one hole with the corresponding screw hole, and a raised ridge extending across the top of the bracket perpendicular to the channel, the raised ridge configured to increase the rigidity of the bracket, wherein the electrical box is configured to couple to the bracket through the at least one screw.

Particular embodiments may comprise one or more of the following features. The at least one hole may comprise a first hole and the at least one screw may comprise at least one first screw, the at least one first screw configured to extend downward through the first hole and align the first hole with the corresponding screw hole, wherein when the at least one first screw extends through the first hole, a shaft of the at least one first screw extends down away from the bottom of the bracket. The at least one first screw may have a plurality of teeth extending radially away from the at least one first screw, the plurality of teeth may form a tooth outer diameter greater than a hole outer diameter of the first hole, and when the at least one first screw is pressed into the first hole, the plurality of teeth may engage with the first hole to hold the at least one first screw in place. The first hole may be unthreaded. The at least one first screw may be a press-fit screw. The bracket assembly may further comprise at least one nut sized to threadedly couple with the at least one first screw and configured to hold the electrical box against the bottom of the bracket. The at least one hole may comprise a second hole and the at least one screw may comprise at least one second screw, the at least one second screw configured to extend upward through the second hole, wherein the electrical box is configured to couple to the bracket through the at least one second screw, and wherein when the at least one second screw extends through the second hole, a shaft of the at least one second screw extends up away from the top of the bracket. The second hole may be threaded. The channel may have two sides, wherein the two sides of the channel are angled inward and configured to grip the ceiling fan brace when installed on the ceiling fan brace.

The foregoing and other aspects, features, applications, and advantages will be apparent to those of ordinary skill in the art from the specification, drawings, and the claims. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . .," if the claims also recite any structure, material or acts in support of that means or step, or that perform the recited function, then it is the clear intention of the inventors not to invoke the provisions of 35 U.S.C. § 112(f). Moreover, even if the provisions of 35 U.S.C. § 112(f) are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those of ordinary skill in the art from the specification, drawings, and the claims.

BRIEF DESCRIPTION OF THE DRAWINGS

Implementations will hereinafter be described in conjunction with the appended drawings, where like designations denote like elements, and.

Figure 1:
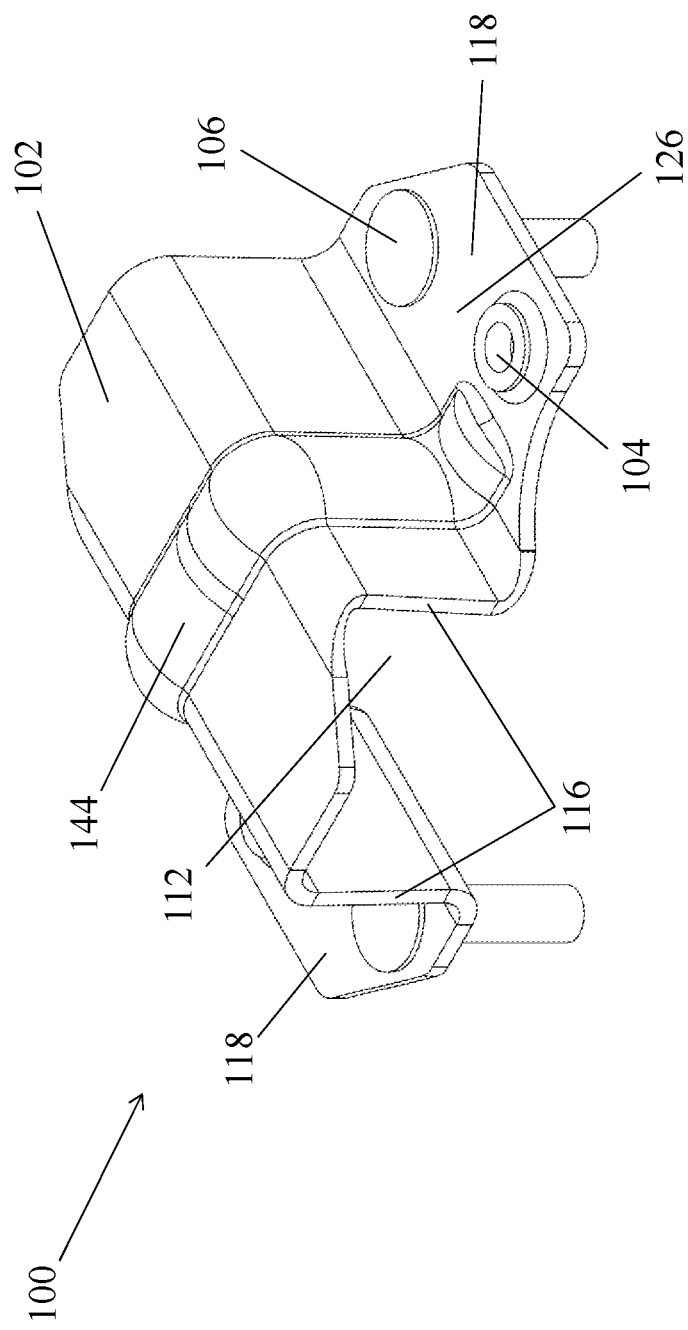
FIG. 1 is a top perspective view of a ceiling fan brace bracket assembly.
Figure 2:
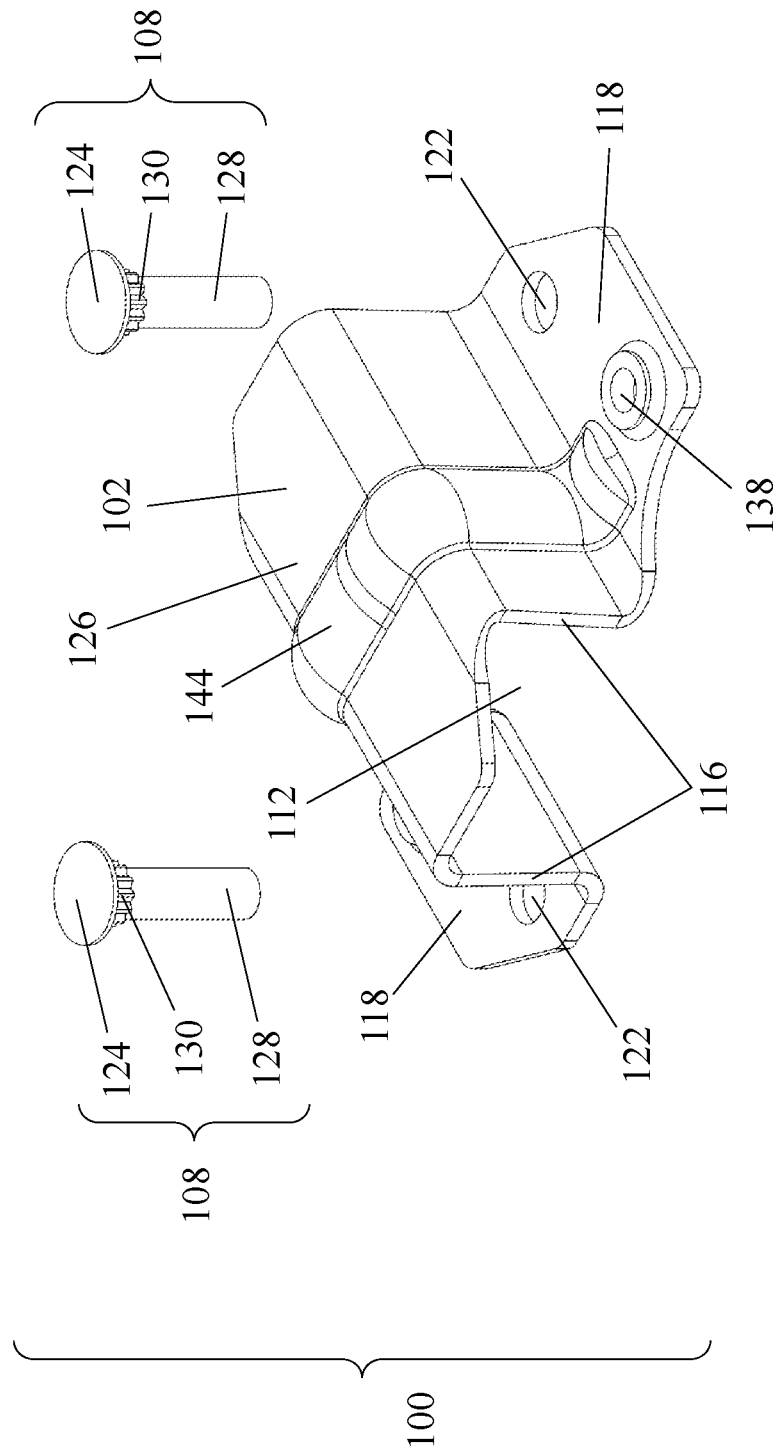
FIG. 2 is an exploded view of the bracket assembly shown in FIG. 1.
Figure 3:
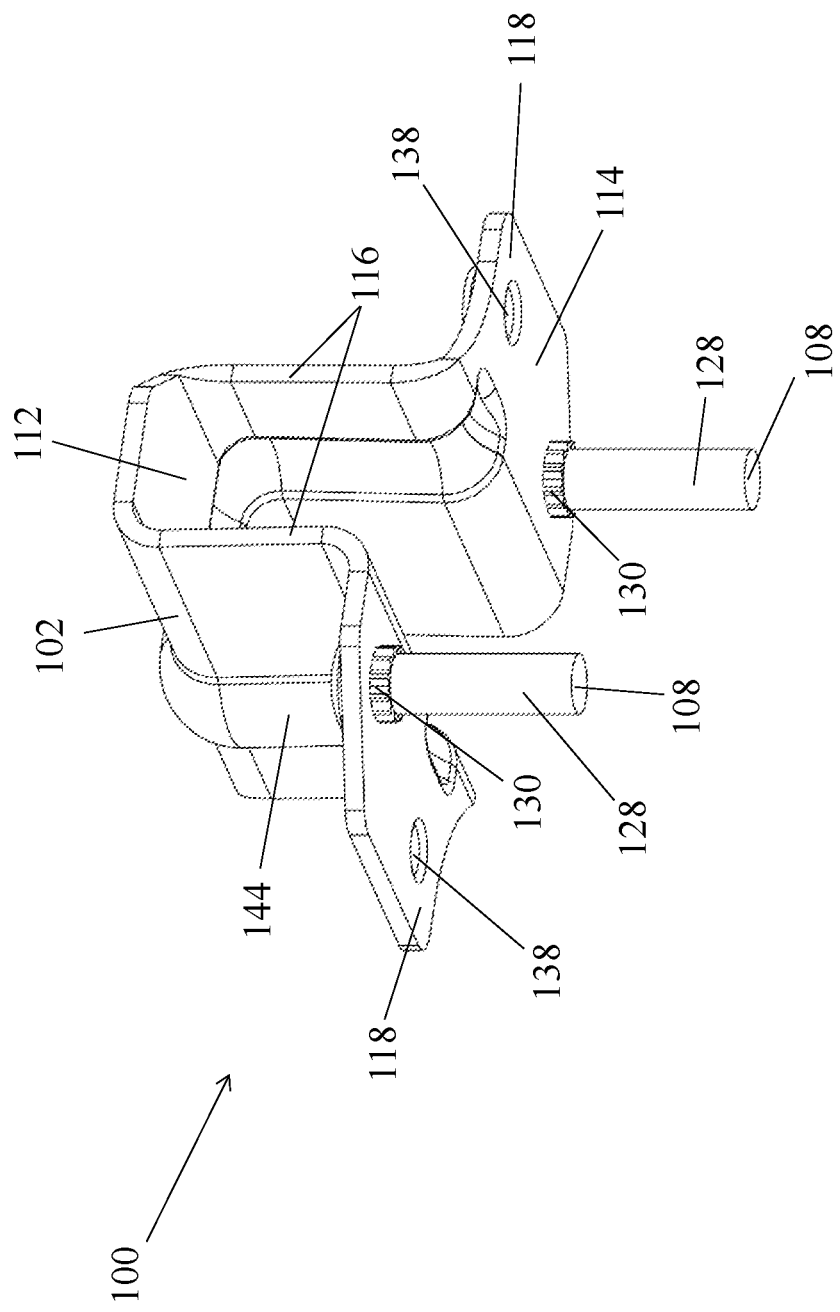
FIG. 3 is a bottom perspective view of the bracket assembly shown in FIG. 1.
Figure 4:
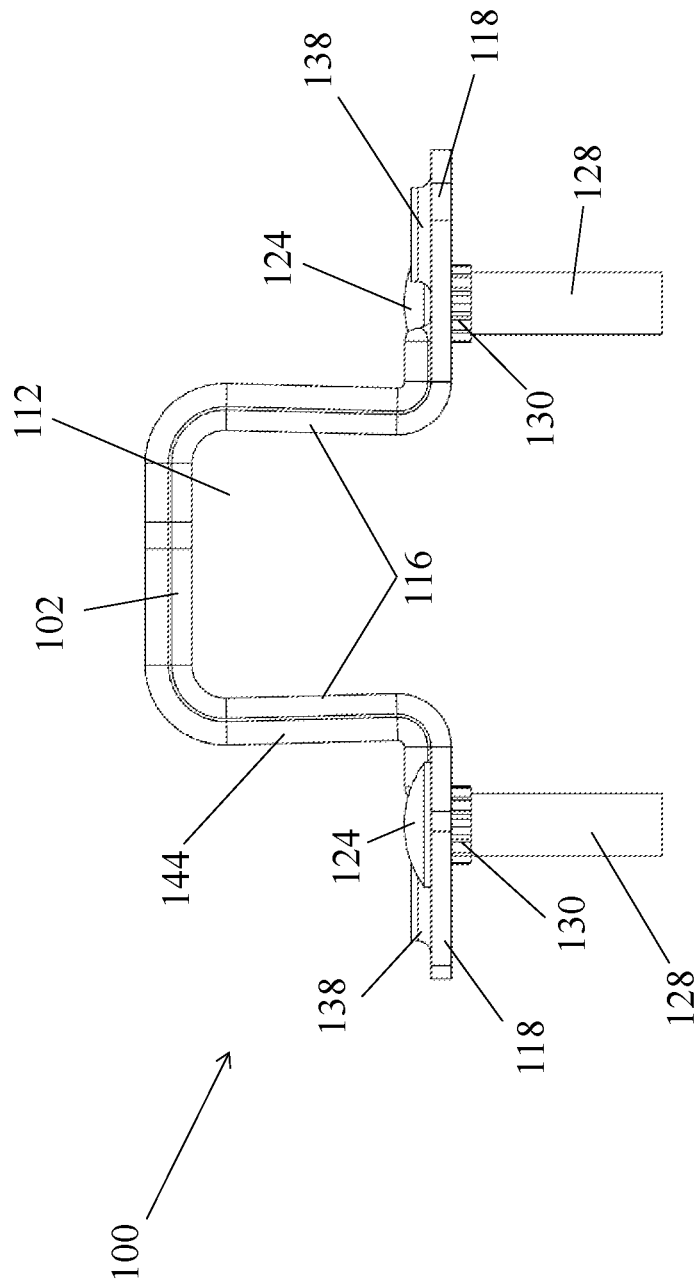
FIG. 4 is a side view of the bracket assembly shown in FIG. 1, looking along the channel.
Figure 5:
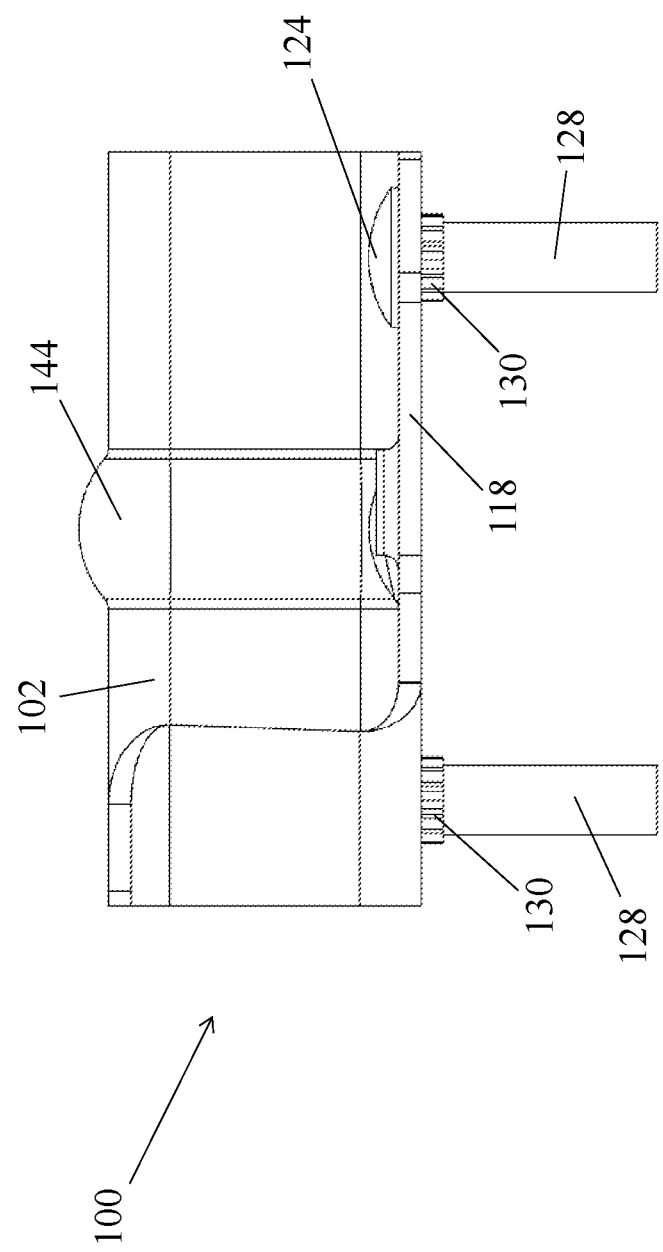
FIG. 5 is a side view of the bracket assembly shown in FIG. 1, looking perpendicular to the channel.
Figure 6:
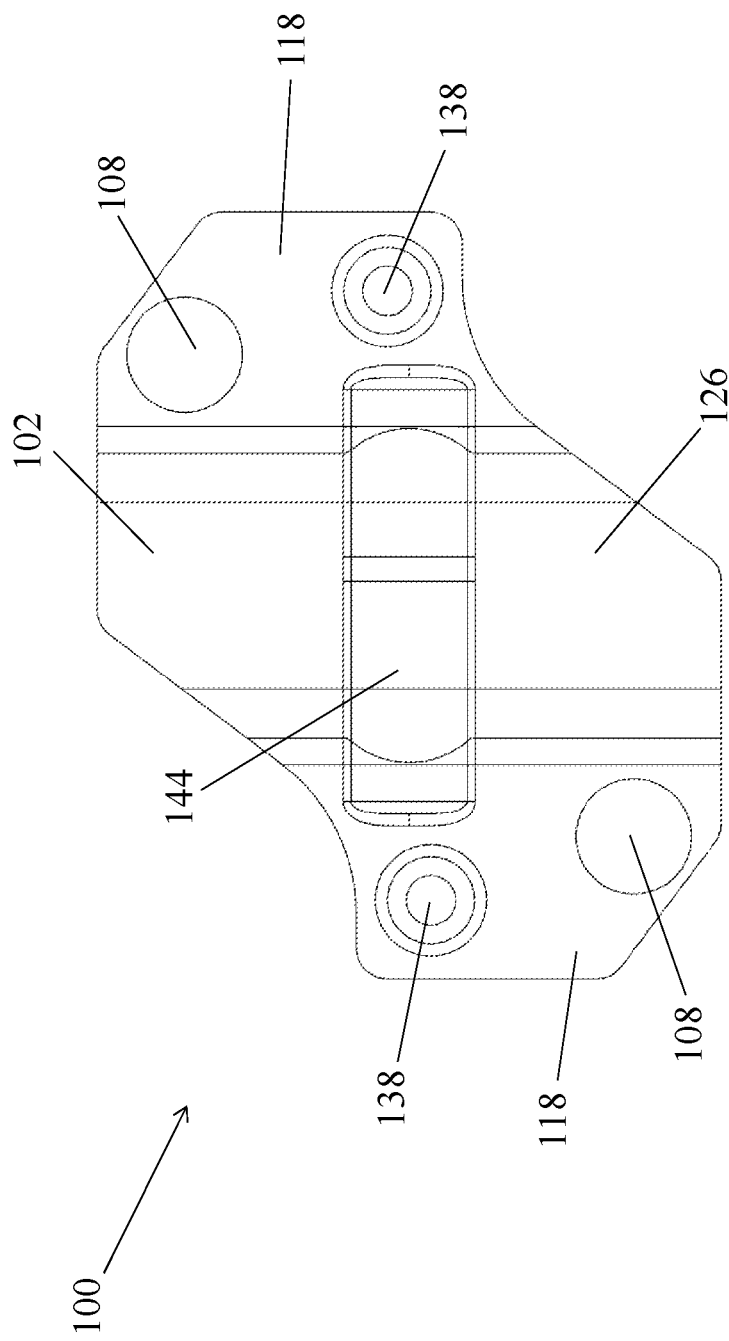
FIG. 6 is a top view of the bracket assembly shown in FIG. 1.
Figure 7:
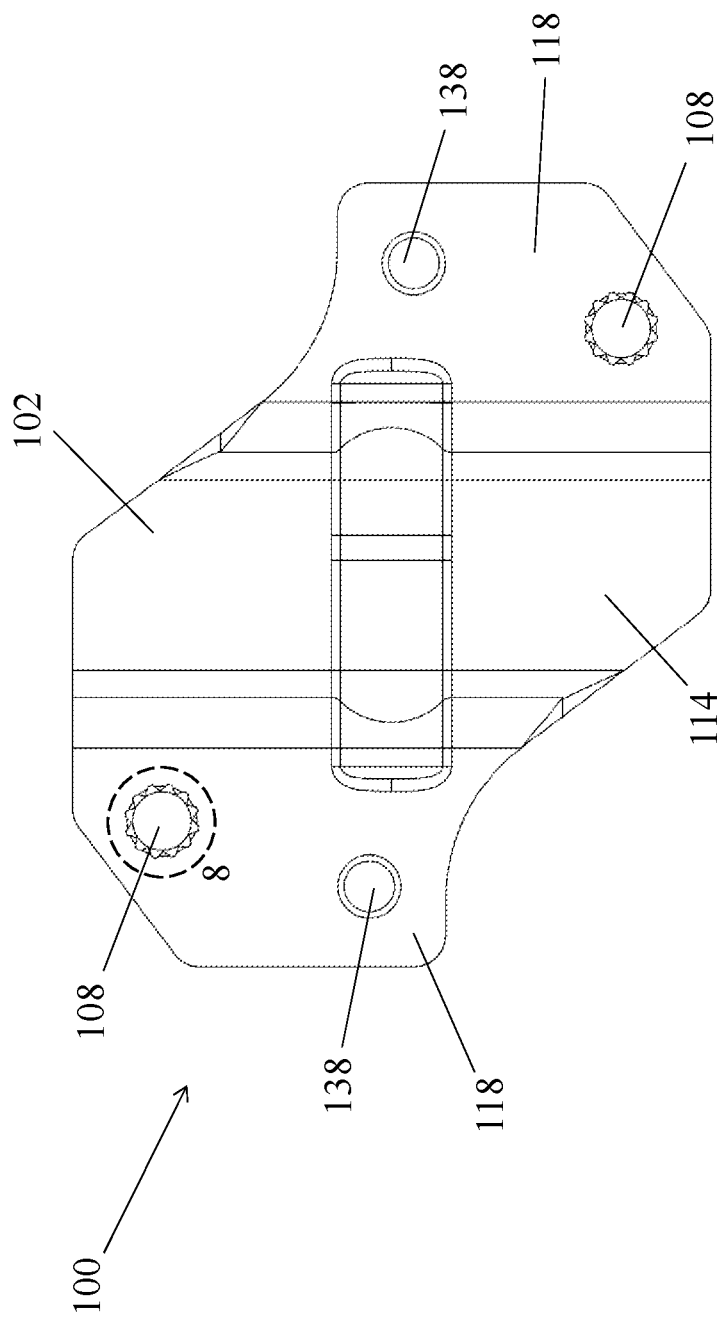
FIG. 7 is a bottom view of the bracket assembly shown in FIG. 1.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations.

DETAILED DESCRIPTION

This disclosure, its aspects and implementations, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

While this disclosure includes a number of implementations that are described in many different forms, there is shown in the drawings and will herein be described in detail particular implementations with the understanding that the present disclosure is to be considered as an exemplification of the principles of the disclosed methods and systems, and is not intended to limit the broad aspect of the disclosed concepts to the implementations illustrated.

In the following description, reference is made to the accompanying drawings which form a part hereof, and which show by way of illustration possible implementations. It is to be understood that other implementations may be utilized, and structural, as well as procedural, changes may be made without departing from the scope of this document. As a matter of convenience, various components will be described using exemplary materials, sizes, shapes, dimensions, and the like. However, this document is not limited to the stated examples and other configurations are possible and within the teachings of the present disclosure. As will become apparent, changes may be made in the function and/or arrangement of any of the elements described in the disclosed exemplary implementations without departing from the spirit and scope of this disclosure.

The present disclosure relates to a ceiling fan brace bracket assembly 100. The bracket assembly 100 is configured to facilitate installation of the bracket assembly 100 on a ceiling fan brace 10 and reduce the number of abrasive surfaces within the electrical box 20 supported by the bracket assembly 100. As illustrated in FIGS. 1-7, the bracket assembly 100 has a bracket 102, at least one hole 104, and at least one screw 106. The at least one screw 106 may comprise at least one first screw 108 and at least one second screw 110. The bracket 102 has a channel 112 opening toward a bottom 114 of the bracket 102. The channel 112 is sized and shaped to extend around the ceiling fan brace 10, regardless of the shape of the ceiling fan brace 10. For example, the channel 112 may fit around a ceiling fan brace 10 with a circular cross section, a rectangular cross section, a hexagonal cross section, or any other cross section. As shown specifically in FIG. 4, the channel 110 may have two sides 116 which are angled inward as the two sides 116 extend down toward the opening of the channel 112. Thus, the two sides 116 are configured to grip the ceiling fan brace 10 when the bracket 102 is installed on the ceiling fan brace 10.

The bracket 102 also has at least one lip 118 extending along the channel 112. The at least one lip 118 may extend along the entire length of the channel 112 or may extend along only a portion of the channel 112. The at least one hole 104 extends through the at least one lip 118. The at least one hole 104 may be at least two holes 104. Each of the at least one hole 104 is configured to align with a corresponding screw hole 120 in the electrical box 20.

Figure 8:
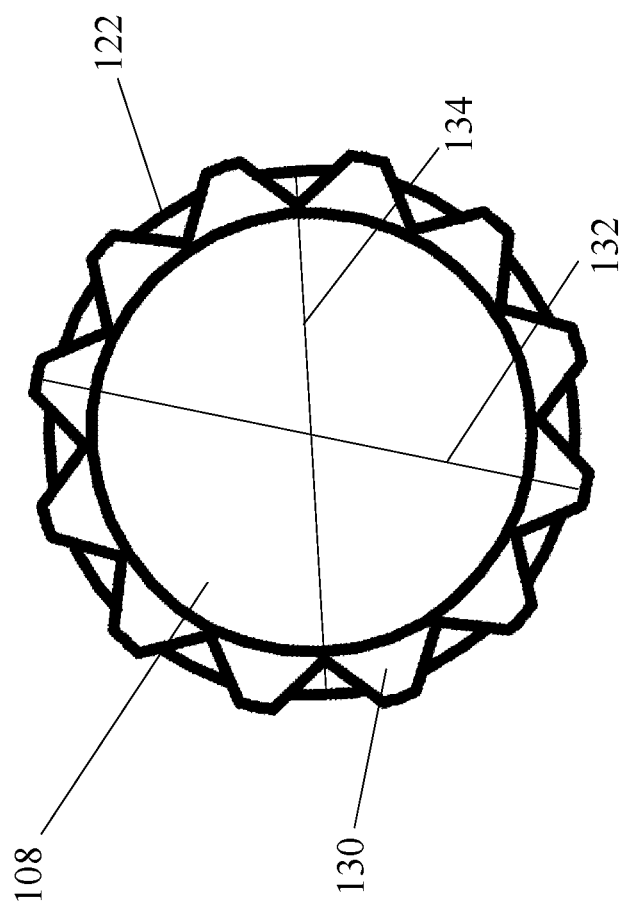
FIG. 8 is a close-up view of the bracket assembly taken from circle 8 shown in FIG. 7, showing the interface between the at least one first screw and the first hole.
Figure 9:
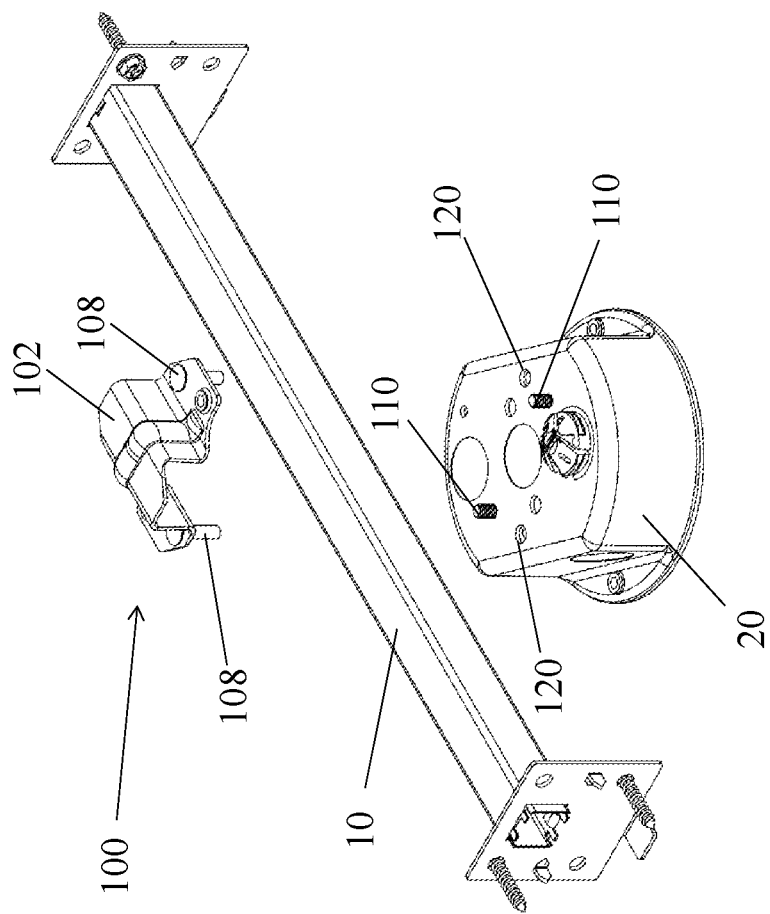
FIG. 9 is a perspective view of the bracket assembly shown in FIG. 1 with a ceiling fan brace and an electrical box.
Figure 10:
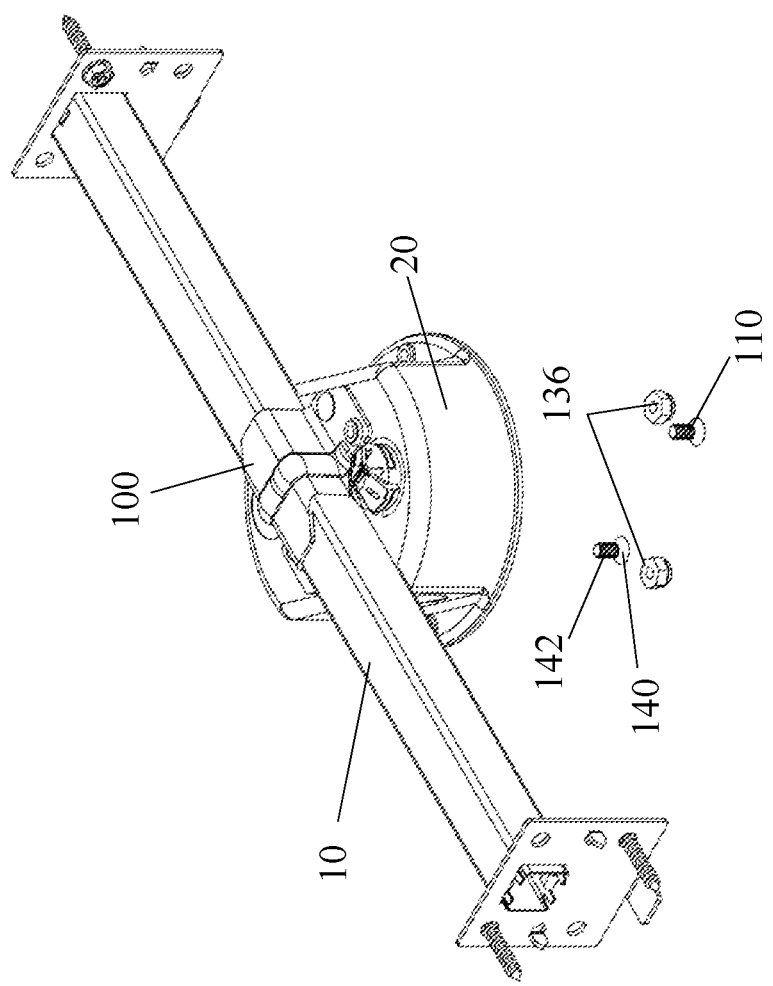
FIG. 10 is a top perspective view of the bracket assembly, ceiling fan brace, and electrical box shown in FIG. 9, with the bracket assembly placed on the ceiling fan brace.
Figure 11:
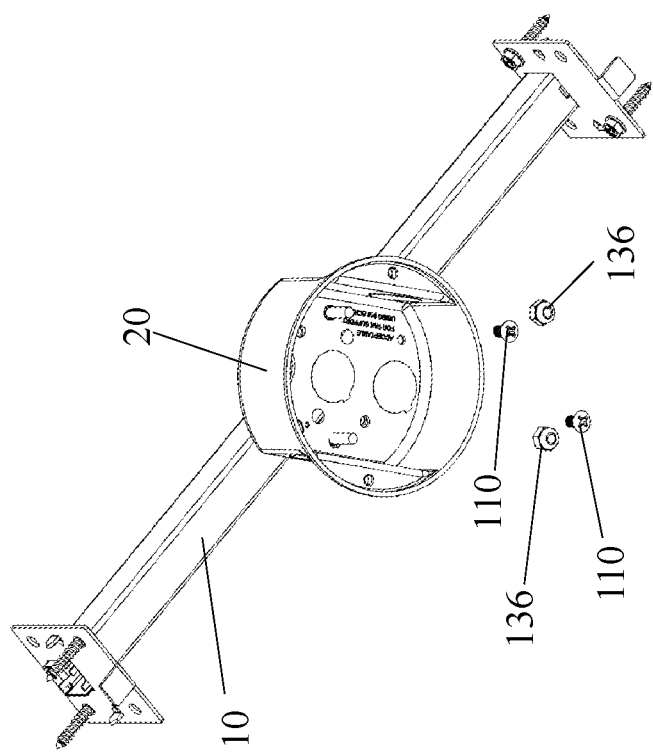
FIG. 11 is bottom perspective view of the bracket assembly, ceiling fan brace, and electrical box shown in FIG. 9, with the bracket assembly placed on the ceiling fan brace.
Figure 12:
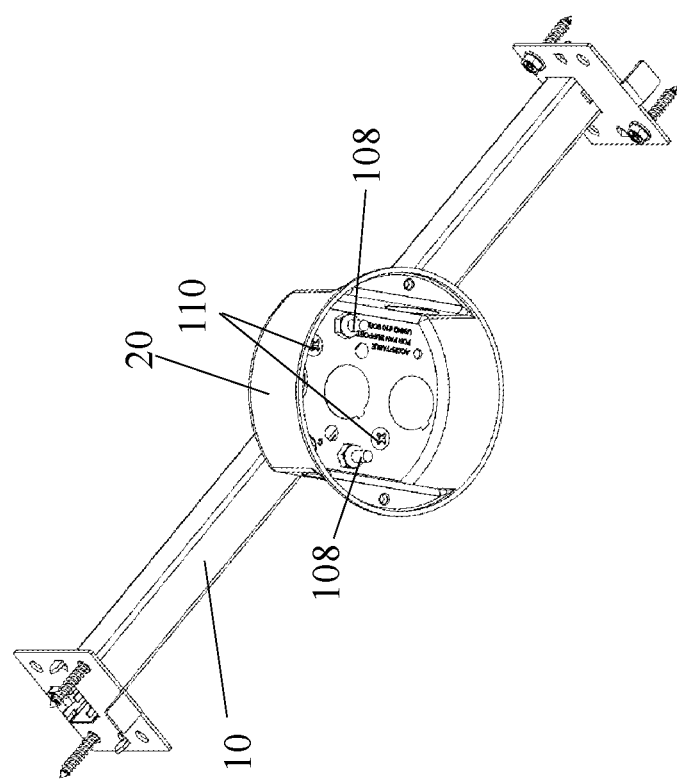
FIG. 12 is bottom perspective view of the bracket assembly, ceiling fan brace, and electrical box shown in FIG. 9, with the at least one nut coupled with the at least one first screw and the electrical box coupled to the bracket assembly through the at least one second screw.
Figure 13:
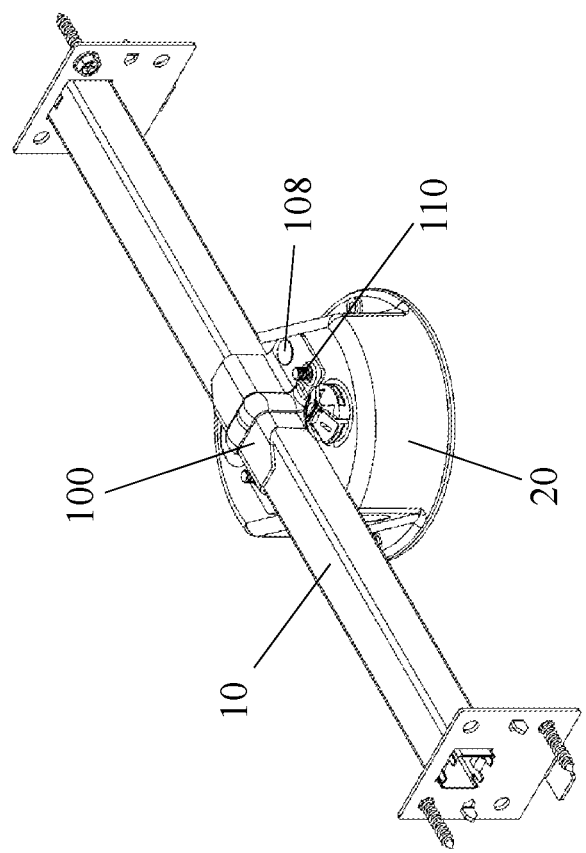
FIG. 13 is a top perspective view of the bracket assembly shown in FIG. 1 installed on a ceiling fan brace with an electrical box.

The at least one first screw 108 is configured to extend downward through a first hole 122 of the at least one hole 104 and through the corresponding screw hole 120 in the electrical box 20. Thus, the at least one first screw 108 is configured to align the first hole 122 with the corresponding screw hole 120. When the at least one first screw 108 extends through the first hole 122, a head 124 of the at least one first screw 108 may be on a top 126 of the bracket 102 and a shaft 128 of the at least one first screw 108 may extend down away from the bottom 114 of the bracket 102. The first hole 122 may be unthreaded, and the at least one first screw 108 may be a press-fit screw. For example, the at least one first screw 108 may have a plurality of teeth 130 that extend radially away from the at least one first screw 108 and form a tooth outer diameter 132. The tooth outer diameter 132 is greater than a hole outer diameter 134 of the first hole 122, as shown in FIG. 8. Thus, when the at least one first screw 108 is pressed into the first hole 122, the plurality of teeth 130 may engage with the first hole 122 to hold the at least one first screw 108 in place. The plurality of teeth 130 may dig into and deform the bracket 102. The bracket assembly 100 may also comprise at least one nut 136 sized to threadedly couple with the at least one first screw 108, as shown in FIGS. 9-13. The at least one nut 136 may be coupled to the at least one first screw 108 after the at least one first screw 108 extends through the first hole 122 and the corresponding screw hole 120 of the electrical box 20. Thus, the at least one nut 136 is configured to hold the electrical box 20 against the bottom 114 of the bracket 102, as shown in FIG. 12.

The at least one second screw 110 is configured to extend upward through a second hole 138 of the at least one hole 104 and through the corresponding screw hole 120 in the electrical box 20. The second hole 138 may be threaded. The electrical box 20 is configured to couple to the bracket 102 through the at least one second screw 110. When the at least one second screw 110 extends through the second hole 138, a head 140 of the at least one second screw 110 may be adjacent the bottom 114 of the bracket 102 and a shaft 142 of the at least one second screw 110 may extend up away from the top 126 of the bracket 102. The bracket assembly 100 may also comprise a raised ridge 144 extend across the top 126 of the bracket 102. The raised ridge 144 may be perpendicular to the channel 112. The raised ridge 144 is configured to increase the rigidity of the bracket 102.

The at least one first screw 108 and the at least one second screw 110 configured as described above allow the bracket assembly 100 to securely hold the electrical box 20, while decreasing the number of abrasive surfaces within the electrical box 20. In addition, the at least one first screw 108 facilitates aligning the first hole 122 with the corresponding screw hole 120 because the at least one first screw 108 can extend through the first hole 122 and the corresponding screw hole 120 without rotating. Thus, the bracket assembly 100 facilitates installation and reduces the number of abrasive surfaces within the electrical box 20.

It will be understood that implementations of a bracket assembly are not limited to the specific assemblies, devices and components disclosed in this document, as virtually any assemblies, devices and components consistent with the intended operation of a bracket assembly may be used. Accordingly, for example, although particular bracket assemblies, and other assemblies, devices and components are disclosed, such may include any shape, size, style, type, model, version, class, measurement, concentration, material, weight, quantity, and/or the like consistent with the intended operation of bracket assemblies. Implementations are not limited to uses of any specific assemblies, devices and components; provided that the assemblies, devices and components selected are consistent with the intended operation of a bracket assembly.

Accordingly, the components defining any bracket assembly may be formed of any of many different types of materials or combinations thereof that can readily be formed into shaped objects provided that the materials selected are consistent with the intended operation of a bracket assembly. For example, the components may be formed of: polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; glasses (such as quartz glass), carbon-fiber, aramid-fiber, any combination thereof, and/or other like materials; composites and/or other like materials; metals, such as zinc, magnesium, titanium, copper, lead, iron, steel, carbon steel, alloy steel, tool steel, stainless steel, brass, nickel, tin, antimony, pure aluminum, 1100 aluminum, aluminum alloy, any combination thereof, and/or other like materials; alloys, such as aluminum alloy, titanium alloy, magnesium alloy, copper alloy, any combination thereof, and/or other like materials; any other suitable material; and/or any combination of the foregoing thereof. In instances where a part, component, feature, or element is governed by a standard, rule, code, or other requirement, the part may be made in accordance with, and to comply under such standard, rule, code, or other requirement.

Various bracket assemblies may be manufactured using conventional procedures as added to and improved upon through the procedures described here. Some components defining a bracket assembly may be manufactured simultaneously and integrally joined with one another, while other components may be purchased pre-manufactured or manufactured separately and then assembled with the integral components. Various implementations may be manufactured using conventional procedures as added to and improved upon through the procedures described here.

Accordingly, manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, any combination thereof, and/or the like for example, depending on, among other considerations, the particular material forming the components.

It will be understood that methods for manufacturing or assembling bracket assemblies are not limited to the specific order of steps as disclosed in this document. Any steps or sequence of steps of the assembly of a bracket assembly indicated herein are given as examples of possible steps or sequence of steps and not as limitations, since various assembly processes and sequences of steps may be used to assemble bracket assemblies.

The implementations of a bracket assembly described are by way of example or explanation and not by way of limitation. Rather, any description relating to the foregoing is for the exemplary purposes of this disclosure, and implementations may also be used with similar results for a variety of other applications employing a bracket assembly.

What is claimed is:

1. A ceiling fan brace bracket assembly, comprising:
   a bracket having a channel opening toward a bottom of the bracket and at least one lip extending along the channel, the channel having two sides, wherein the two sides of the channel are angled inward from a base of the channel toward the bottom of the bracket such that the channel is narrower adjacent the bottom of the bracket than at the base of the channel, the channel sized and shaped to extend around a ceiling fan brace;
   at least two holes extending through the at least one lip, each of the at least two holes configured to align with a corresponding screw hole in an electrical box;
   at least one first screw configured to extend downward through a first hole of the at least two holes and the corresponding screw hole in the electrical box and align the first hole with the corresponding screw hole, wherein the first hole is unthreaded, the at least one first screw is a press-fit screw configured to dig into and deform the bracket, and, when the at least one first screw extends through the first hole, a head of the at least one first screw is on a top of the bracket and a shaft of the at least one first screw extends down away from the bottom of the bracket;
   at least one nut sized to threadedly couple with the at least one first screw and configured to hold the electrical box against the bottom of the bracket; and
   at least one second screw configured to extend upward through a second hole of the at least two holes and the corresponding screw hole, wherein the electrical box is configured to couple to the bracket through the at least one second screw, and wherein when the at least one second screw extends through the second hole, a head of the at least one second screw is adjacent the bottom of the bracket and a shaft of the at least one second screw extends up away from the top of the bracket.

2. The bracket assembly of claim 1, further comprising a raised ridge extending across the top of the bracket perpendicular to the channel, the raised ridge configured to increase the rigidity of the bracket.

3. The bracket assembly of claim 1, wherein the at least one first screw has a plurality of teeth extending radially away from the at least one first screw, the plurality of teeth forms a tooth outer diameter greater than a hole outer diameter of the first hole, and when the at least one first screw is pressed into the first hole, the plurality of teeth engage with the first hole to hold the at least one first screw in place.

4. A ceiling fan brace bracket assembly, comprising:
a bracket having a channel opening toward a bottom of the bracket and at least one lip extending along the channel, the channel having two sides, wherein the two sides of the channel are angled inward from a base of the channel toward the bottom of the bracket such that the channel is narrower adjacent the bottom of the bracket than at the base of the channel, the channel sized and shaped to extend around a ceiling fan brace;
at least two holes extending through the at least one lip, each of the at least two holes configured to align with a corresponding screw hole in an electrical box;
at least one first screw configured to extend downward through a first hole of the at least two holes and align the first hole with the corresponding screw hole, wherein when the at least one first screw extends through the first hole, a shaft of the at least one first screw extends down away from the bottom of the bracket; and
at least one second screw configured to extend upward through a second hole of the at least two holes, wherein the electrical box is configured to couple to the bracket through the at least one second screw, and wherein when the at least one second screw extends through the second hole, a shaft of the at least one second screw extends up away from the top of the bracket.

5. The bracket assembly of claim 4, further comprising a raised ridge extending across the top of the bracket perpendicular to the channel, the raised ridge configured to increase the rigidity of the bracket.

6. The bracket assembly of claim 4, wherein the at least one first screw has a plurality of teeth extending radially away from the at least one first screw, the plurality of teeth forms a tooth outer diameter greater than a hole outer diameter of the first hole, and when the at least one first screw is pressed into the first hole, the plurality of teeth engage with the first hole to hold the at least one first screw in place.

7. The bracket assembly of claim 4, wherein the first hole is unthreaded.

8. The bracket assembly of claim 4, wherein the at least one first screw is a press-fit screw.

9. The bracket assembly of claim 4, further comprising at least one nut sized to threadedly couple with the at least one first screw and configured to hold the electrical box against the bottom of the bracket.

10. A ceiling fan brace bracket assembly, comprising:
a bracket having a channel opening toward a bottom of the bracket and at least one lip extending along the channel, the channel sized and shaped to extend around a ceiling fan brace;
at least one hole extending through the at least one lip, the at least one hole configured to align with a corresponding screw hole in an electrical box;
at least one screw configured to extend through the at least one hole and align the at least one hole with the corresponding screw hole, wherein the at least one screw is a press-fit screw configured to dig into and deform the bracket; and
a raised ridge extending across the top of the bracket perpendicular to the channel, the raised ridge configured to increase the rigidity of the bracket;
wherein the electrical box is configured to couple to the bracket through the at least one screw.

11. The bracket assembly of claim 10, wherein the at least one hole comprises a first hole and the at least one screw comprises at least one first screw, the at least one first screw configured to extend downward through the first hole and align the first hole with the corresponding screw hole, wherein when the at least one first screw extends through the first hole, a shaft of the at least one first screw extends down away from the bottom of the bracket.

12. The bracket assembly of claim 11, wherein the at least one first screw has a plurality of teeth extending radially away from the at least one first screw, the plurality of teeth forms a tooth outer diameter greater than a hole outer diameter of the first hole, and when the at least one first screw is pressed into the first hole, the plurality of teeth engage with the first hole to hold the at least one first screw in place.

13. The bracket assembly of claim 11, wherein the first hole is unthreaded.

14. The bracket assembly of claim 11, further comprising at least one nut sized to threadedly couple with the at least one first screw and configured to hold the electrical box against the bottom of the bracket.

15. The bracket assembly of claim 10, wherein the at least one hole comprises a second hole and the at least one screw comprises at least one second screw, the at least one second screw configured to extend upward through the second hole, wherein the electrical box is configured to couple to the bracket through the at least one second screw, and wherein when the at least one second screw extends through the second hole, a shaft of the at least one second screw extends up away from the top of the bracket.

16. The bracket assembly of claim 15, wherein the second hole is threaded.

17. The bracket assembly of claim 10, the channel having two sides, wherein the two sides of the channel are angled inward and configured to grip the ceiling fan brace when installed on the ceiling fan brace.

* * * * *